United States Patent
Lieuwen et al.

(10) Patent No.: US 6,272,502 B1
(45) Date of Patent: Aug. 7, 2001

(54) REFRESHING MATERIALIZED VIEWS OF A DATABASE TO MAINTAIN CONSISTENCY WITH UNDERLYING DATA

(75) Inventors: Daniel Francis Lieuwen, Plainfield, NJ (US); Akira Kawaguchi, New York, NY (US); Latha Sankar Colby, Los Altos, CA (US); Kenneth A. Ross, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/075,728

(22) Filed: May 11, 1998

(51) Int. Cl.[7] .................................................. G06F 17/30
(52) U.S. Cl. ............................ 707/203; 707/8; 707/201
(58) Field of Search ................................. 707/201, 203, 707/8, 100

(56) References Cited

U.S. PATENT DOCUMENTS

| | | | |
|---|---|---|---|
| 4,627,019 | * 12/1986 | Ng ............................................. | 707/8 |
| 5,276,870 | * 1/1994 | Shan et al. .............................. | 395/600 |
| 5,287,496 | * 2/1994 | Chen et al. .............................. | 707/203 |
| 5,317,731 | * 5/1994 | Dias et al. ............................... | 707/8 |
| 5,403,639 | * 4/1995 | Belsan et al. ........................... | 707/204 |
| 5,581,753 | * 12/1996 | Terry et al. .............................. | 395/617 |
| 5,829,001 | * 10/1998 | Li et al. ................................... | 707/201 |
| 5,873,098 | * 2/1999 | Bamford et al. ........................ | 707/203 |
| 5,884,325 | * 3/1999 | Bauer et al. ............................. | 707/201 |
| 5,913,029 | * 6/1999 | Shostak ................................... | 707/201 |
| 5,924,103 | * 7/1999 | Ahmed et al. .......................... | 707/201 |
| 5,926,816 | * 7/1999 | Bauer et al. ............................. | 707/8 |
| 5,956,713 | * 9/1999 | Bamford et al. ........................ | 707/8 |
| 5,956,731 | * 9/1999 | Bamford et al. ........................ | 707/201 |
| 5,963,959 | * 10/1999 | Sun et al. ................................ | 707/200 |

OTHER PUBLICATIONS

"Deriving Production Rules for Incremental View Maintenance," by Ceri & Widom. Sep. 1991.

"Incremental Maintenance of Views with Duplicates," by Griffin & Libkin. May 1995.

(List continued on next page.)

Primary Examiner—Jean R. Homere

(57) ABSTRACT

In a database, a database manager can generate a view, which can be considered as a subset of the database, and which is placed outside the database for use without disturbing the database. However, if the database changes, the views will not reflect those changes, because the views are separate from the database. To solve this problem, a process called "refreshing" keeps the views consistent with the data within the database. But different refreshing approaches are used: some views require immediate refreshing when the database changes, other types can be refreshed at later times, and still other types can be refreshed at different times and intervals. The invention presents a system which keeps data consistent among the views and the database, despite the different times of refreshing undertaken.

13 Claims, 13 Drawing Sheets

OTHER PUBLICATIONS

"Principles and Techniques in the Design of ADMS," by Roussopoulos and Kang. Dec. 1986.
"Data Integration using Self–Maintainable Views," by Gupta, Jagadish, and Mumick. unknown date.
"Maintenance of Materialized Views: Problems, Techniques, and Applications," by Gupta & Mumick. Unknown Date.
"The Rejuvenation of Materialized Views," by Mumick. Unknown Date.
"Incremental Recomputation of Active Relational Expressions," by Qian & Widerhold.
"View Maintenance in a Warehousing Environment," by Zhuge, Garcia–Molina, Hammer, and Widom. Unknown Date.
"Currency–Based Updates to Distributed Materialized Views," Segev & Fang. Feb. 1990.
"Updating Distributed Materialized Views," by Segev & Park. 1999.
"Efficiently Updating Materialized Views," by Blakely, Larson, and Tompa. Unknown Date.
"Maintaining Views Incrementally," by Gupta, Mumick, and Subrahmanian. Unknown Date.
"Incremental Maintenance of Views with Duplicates," by Griffin & Libkin. Unknown Date.
"View Maintenance Issues for the Chronicle Data Model," by Jagadish, Mumick, and Silberschatz. Unknown Date.
"Algorithms for Deferred View Maintenance," by Colby, Griffin, Libkin, Mumick, and Trickey. 1996.
"Concurrency Control Theory for Deferred Materialized Views," by Kawaguchi, Lieuwen, Mumick, Quass, and Ross. Unknown Date.
"An Algebraic Approach to Supporting Multiple Deferred Views," by Colby and Griffin. Unknown Date.
"A Performance Analysis of View Materialization Strategies," by Hanson. Dec. 1987.
"Aggregate–Query Processing in Data Warehousing Environments," by Gupta, Harinarayan, and Quass. unknown date.
"Using Object–Oriented Principles to Optimize Update Propagation to Materialized Views," by Kuno and Rundensteiner. Unknown Date.
"The Multiview OODB View System: Design and implementation," by Kuno and Rundensteiner. Unknown Date.
"Incorporating Computed Relations in Relational Databases," by Maier and Warren. Unknown Date.
"Maintenance of Views," by Shmueli and Hari. Unknown Date.
"The ADMS project: Views "R" Us," by Roussopoulos, Chen, Kelley, Delis, and Papakonstaninou. Unknown Date.
"Transformational Framework for the Automatic Control of Derived Data," by Koenig and Paige. Unknown Date.
"An Incremental Access Method for ViewCache: Concept, Algorithms, and Cost Analysis," by Roussopoulos. Sep. 1991.

* cited by examiner

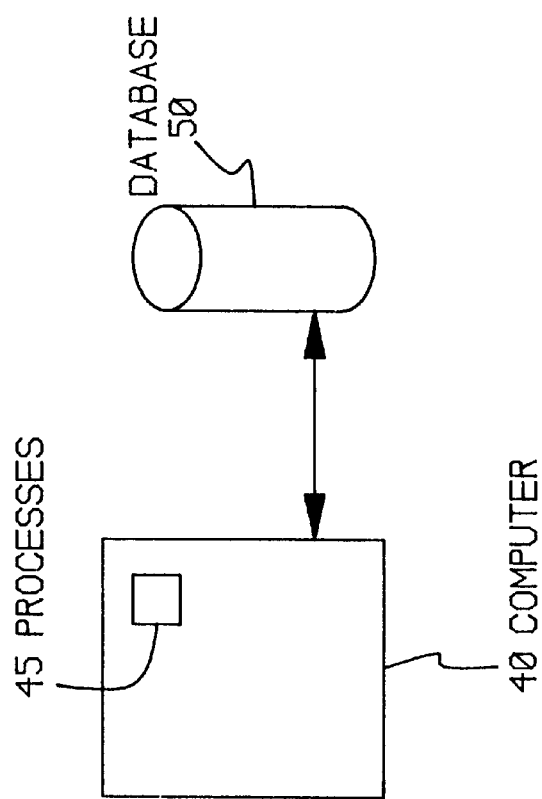
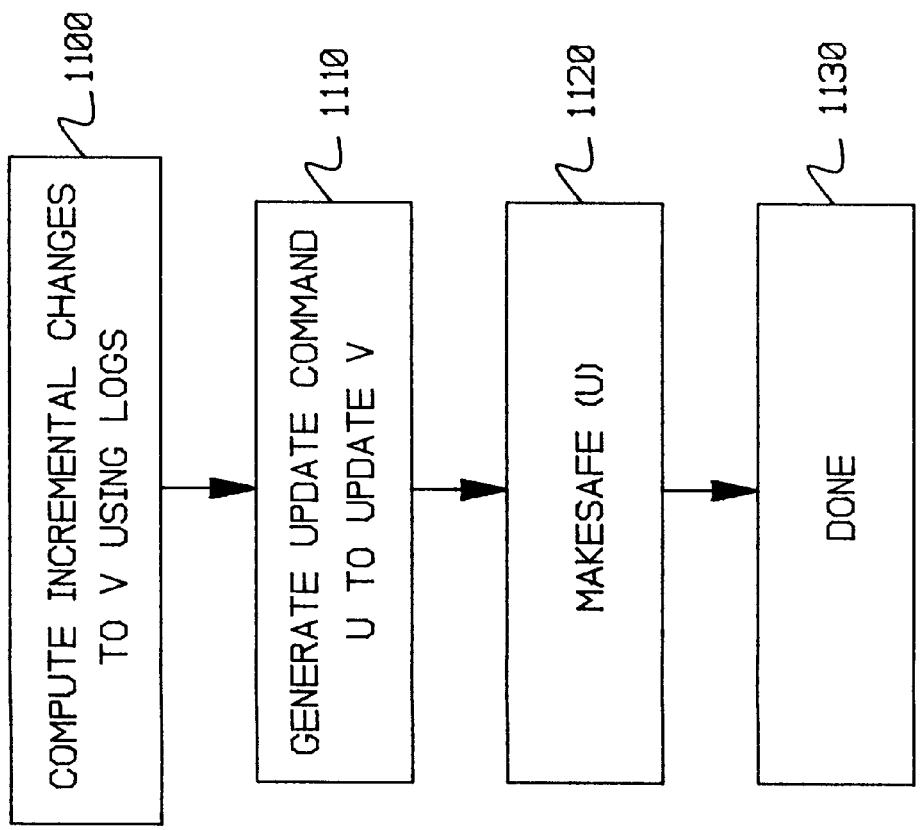

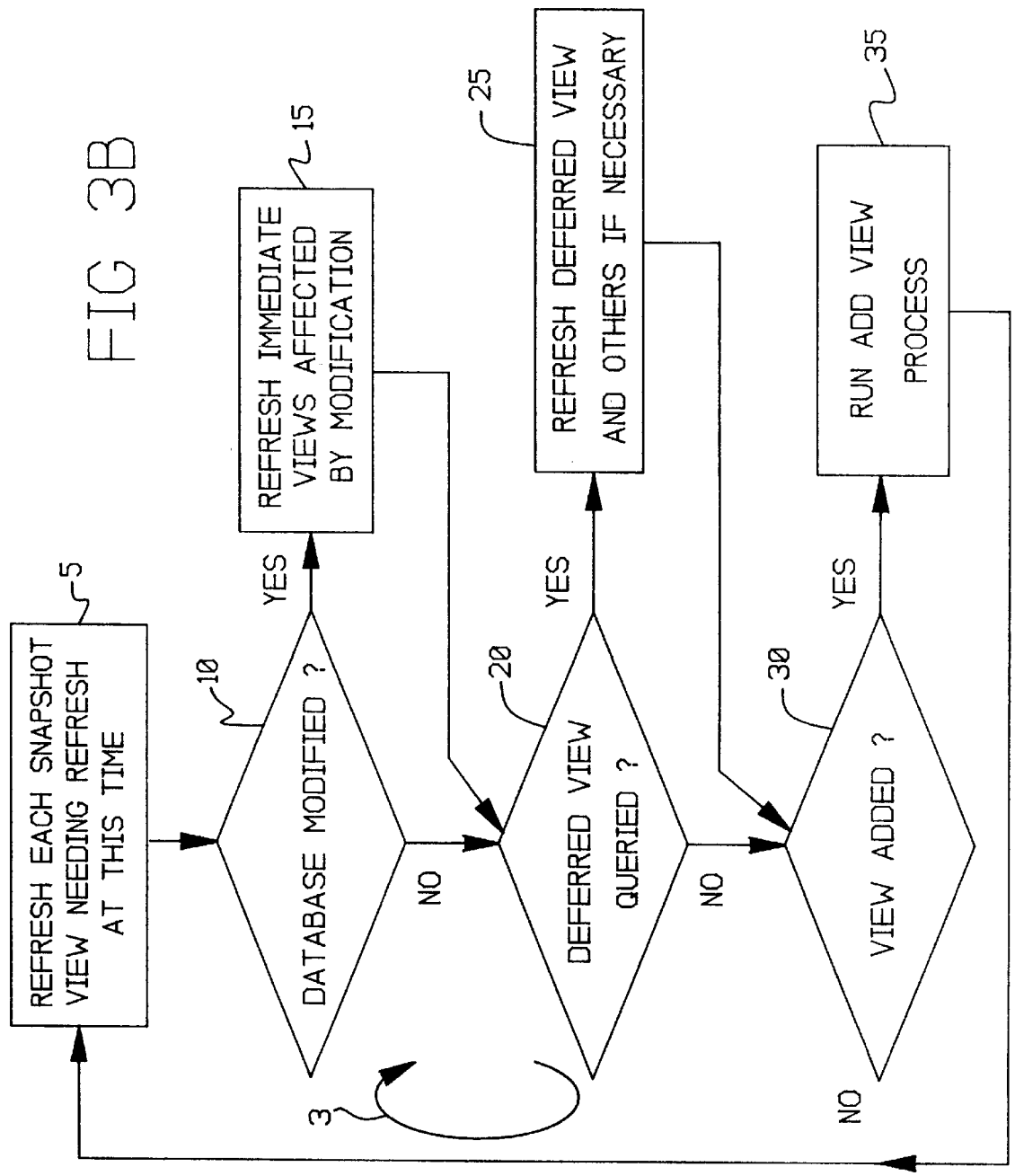

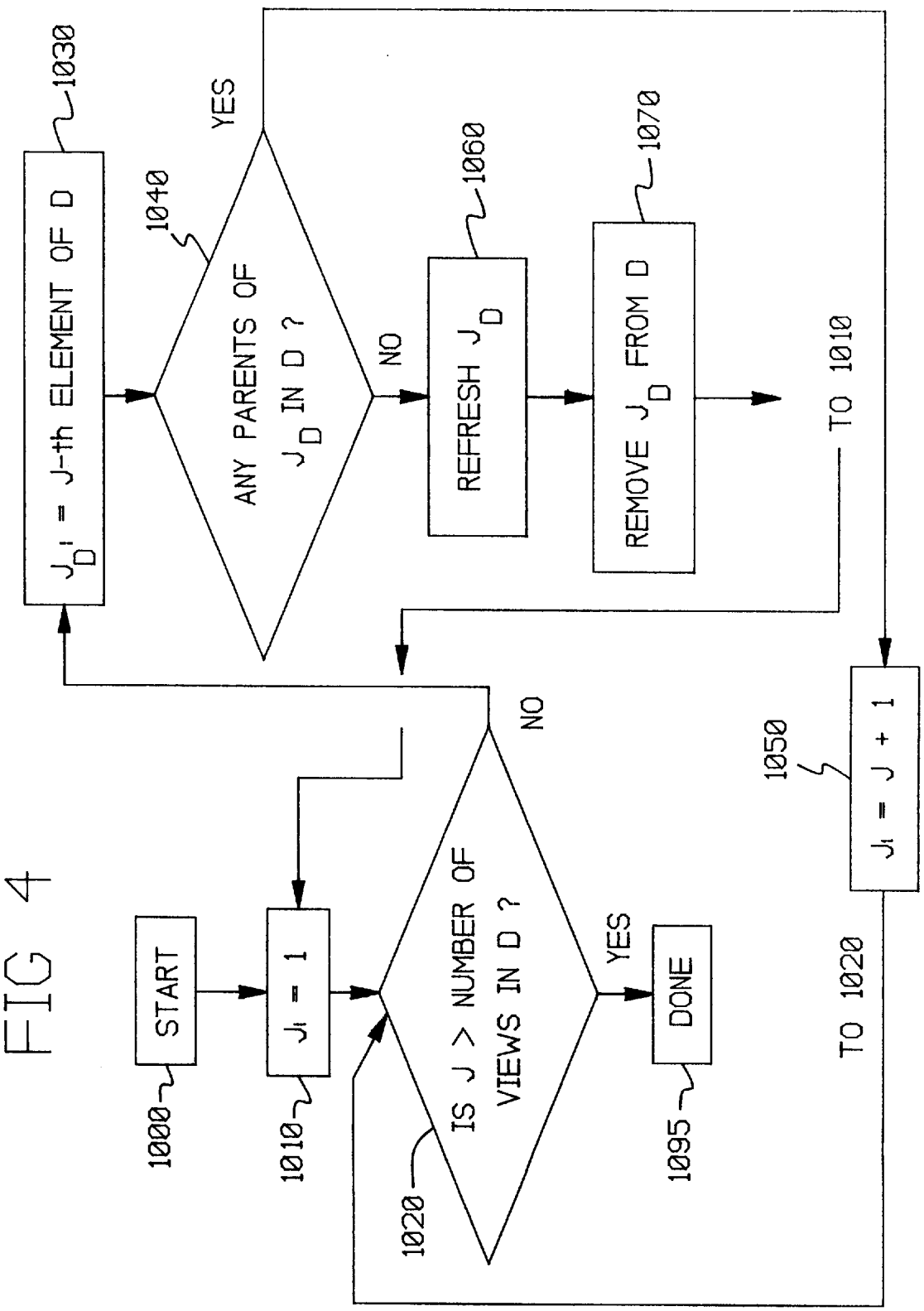

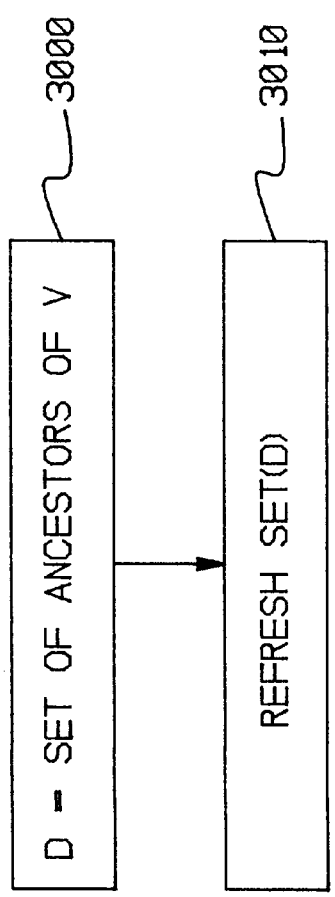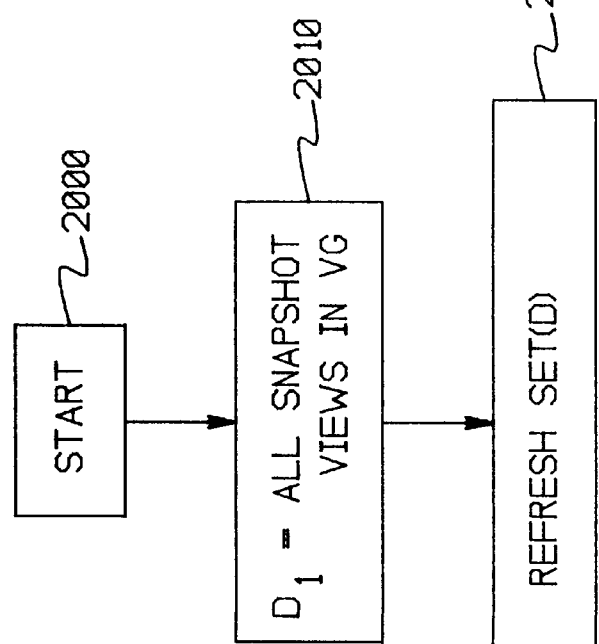

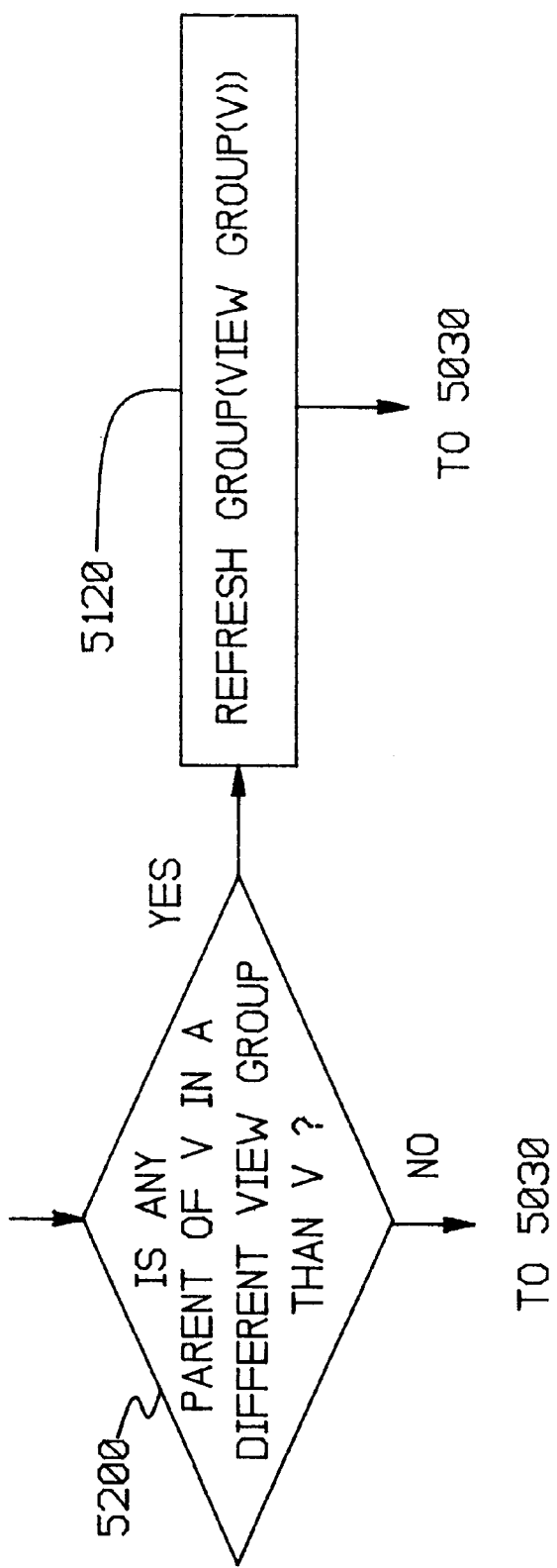

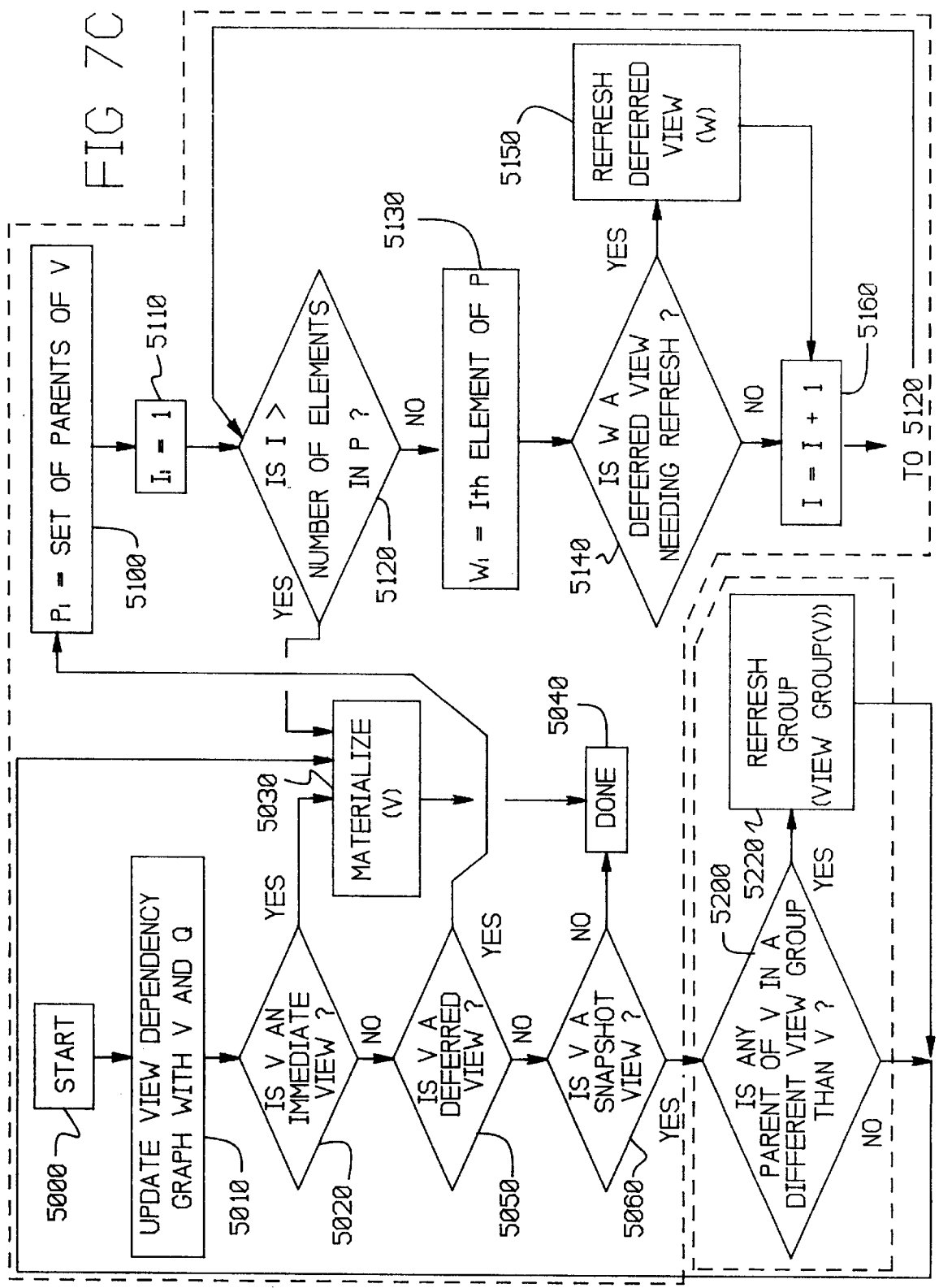

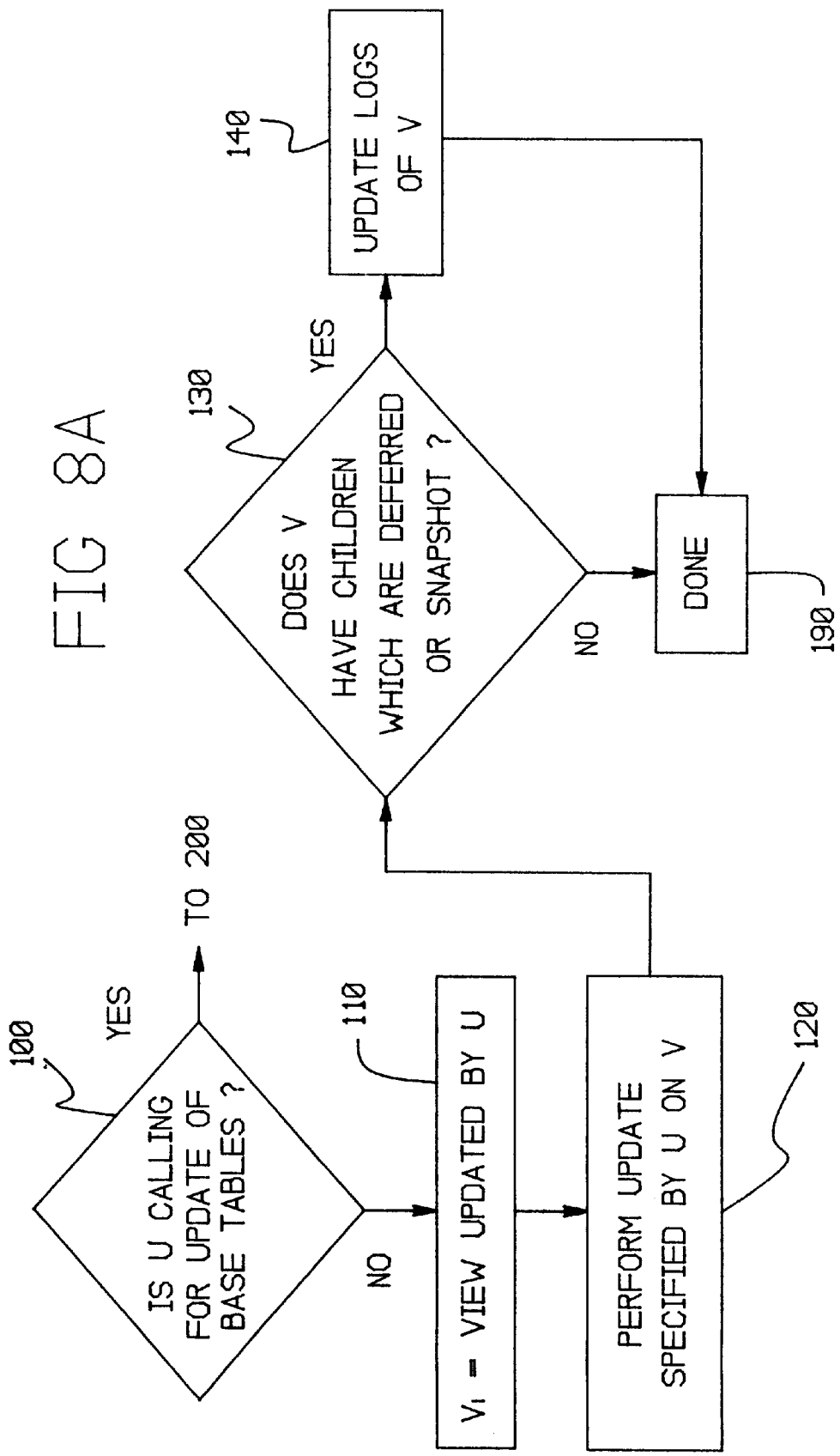

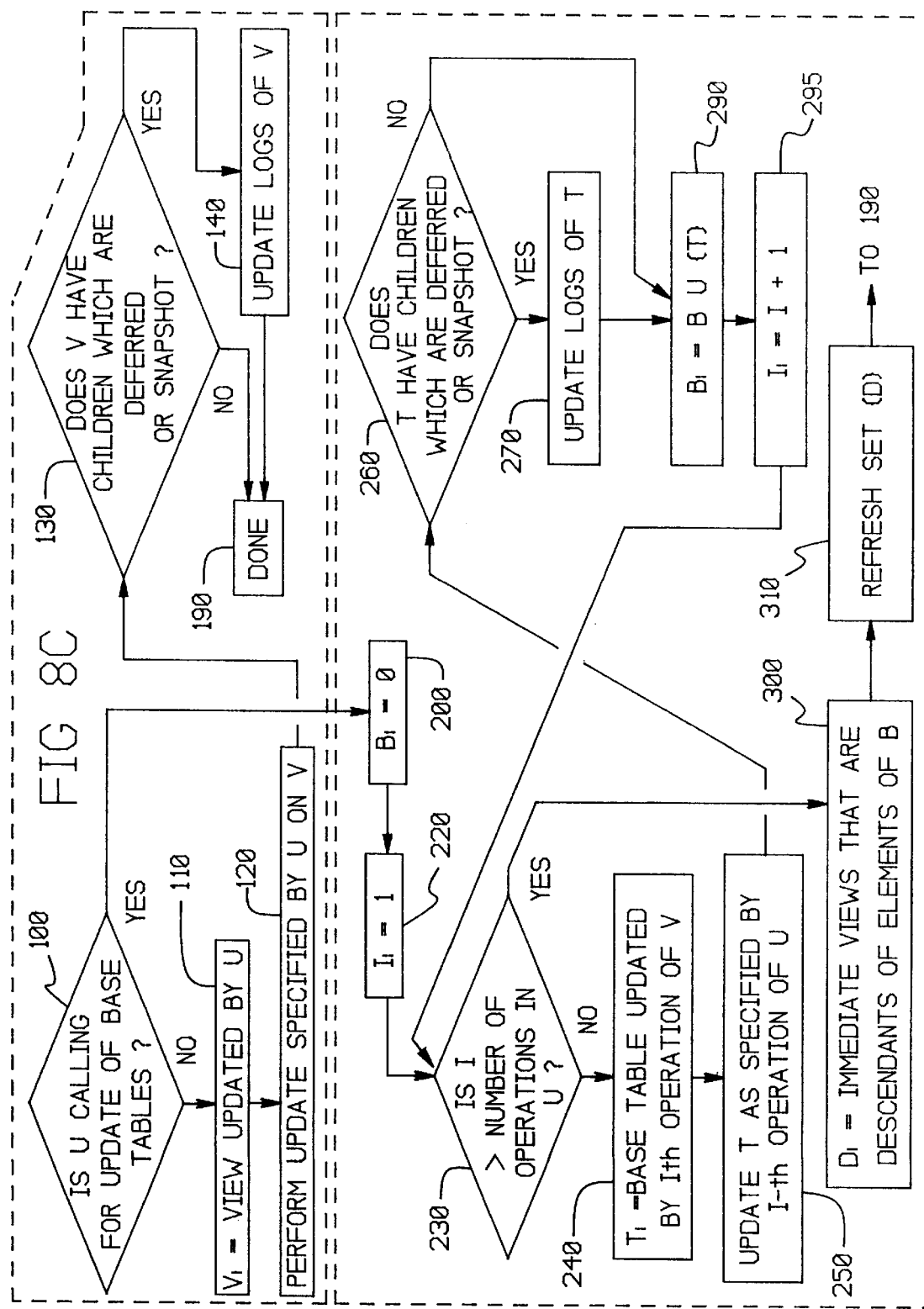

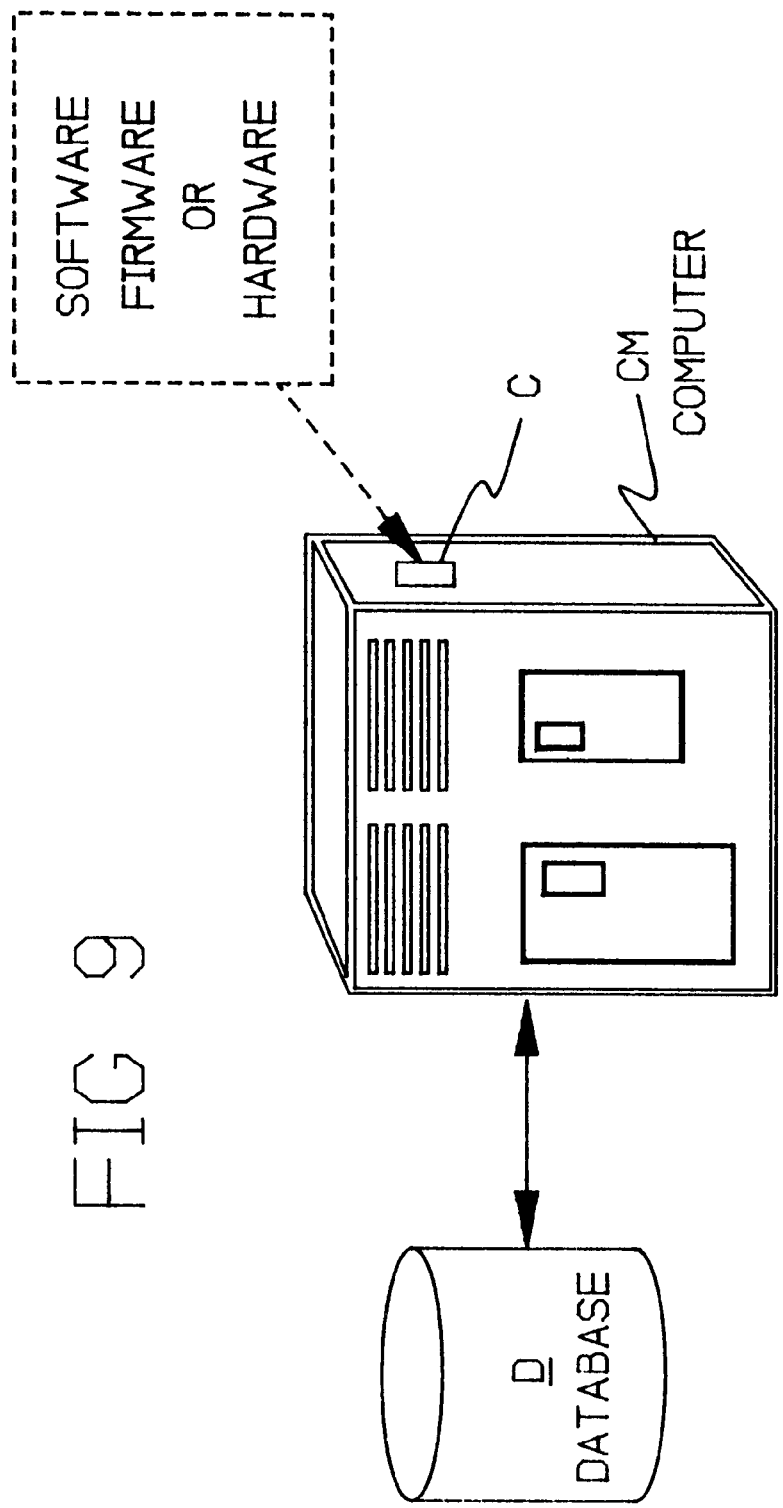

REFRESHING MATERIALIZED VIEWS OF A DATABASE TO MAINTAIN CONSISTENCY WITH UNDERLYING DATA

The invention concerns a database system which provides multiple views of the database, which views are refreshed in response to different events, and thus refreshed at different times. The system maintains data consistency within groups of the views, despite the different refreshing approaches taken for the different views.

BACKGROUND OF THE INVENTION

FIG. 1 illustrates a database DB, which contains data units 3, which, for simplicity, are shown organized into rows R1, R2, . . . RN and columns C1, C2, . . . CM. Users can query the database, by commanding a database management system to retrieve a specified collection of the data units.

For example, assume that the database is a nationwide telephone directory. A user may issue a query requesting retrieval of all telephone numbers assigned to parties named Miller, who live on Main Street. The management system will return these telephone numbers to the user.

In many situations, it is convenient for users of the database DB to deal with a subset of the database, rather than with the database itself. These subsets are termed "views." Continuing the example given above, one view may contain all telephone data within the state of New Jersey. If the user issues the same query identified above, but to this view instead of to the database as-a-whole, only telephone numbers in New Jersey would be retrieved.

Two types of view are commonly used. In one type, queries examine the data contained within the database, and computes the query on-the-fly. In the example given above, only New Jersey data would be examined.

In this type of view, the query software involved is somewhat more complicated, and if the view is defined in terms of a particular type of operation, termed a "join," then queries will run more slowly against this type of view than they would if the data were structured as in the view tuple. However, this disadvantage is offset by the fact that the query command is simpler for the user to formulate. Also, this type of view facilitates storing data in a normalized fashion, thereby removing update anomalies.

In using this type of view, the user specifies the view to be queried, and formulates a query. The user need not be concerned with the details of where the New Jersey data is located, or how it is represented, within the database DB. The query software deals with the location and representation.

The other type of view is termed a materialization of the view. In this type of view, the reformulated data corresponding to the view is actually copied into another storage location, which may be another location within the database, or a location outside the database. Users can query this materialization, independent of other users who query the database itself. Views V1–V3 represent materialized views. The hatched data items are copied into the storage locations, as indicated by the arrows.

However, the use of materialized views can create its own problem. If changes occur to the data items 3 within the database, then the copies of these data items contained in the views V1–V3 will not necessarily correspond to the hatched original data items. Consequently, a user of a view may read data which is not current, and if the user reads multiple data items, the items may be mutually inconsistent.

One solution to this problem is to update the views whenever a change occurs in a data item 3. However, this solution imposes undesired overhead upon the system, and slows data retrieval by users. Consequently, it will often be desirable to defer view updates until a later time.

SUMMARY OF THE INVENTION

In one form of the invention, a database system supports more than one class of view, and the classes are refreshed at different times. The invention maintains data consistency within selected groups of the views, despite the different refreshing rates. This is accomplished by properly coordinating the refreshing operations.

BRIEF DESCRIPTION OF THE DRAWINGS

FIG. 3A is a flow chart illustrating logic undertaken by a refresh operation for a single view.

FIG. 3B is a flow chart illustrating overall operation of the invention.

FIG. 3C illustrates a system implementing one form of the invention.

FIG. 4 is a flow chart illustrating logic undertaken by a refresh operation for a set of views.

FIG. 5 is a flow chart illustrating logic undertaken by a refresh operation for deferred view.

FIG. 6 is a flow chart illustrating logic undertaken by a refresh operation for snapshot view.

FIGS. 7A and 7B show a flow chart illustrating logic undertaken by a an operation in which a view is added.

FIG. 7C illustrates FIGS. 7A and 7B on a single sheet, for reference.

FIGS. 8A and 8B show a flow chart illustrating logic undertaken by a Makesafe operation, which is called in FIG. 3A.

FIG. 8C illustrates FIGS. 8A and 8B on a single sheet, for reference.

FIG. 9 illustrates one form of the invention.

DETAILED DESCRIPTION OF THE INVENTION

Preliminary Matters

Figure 1:
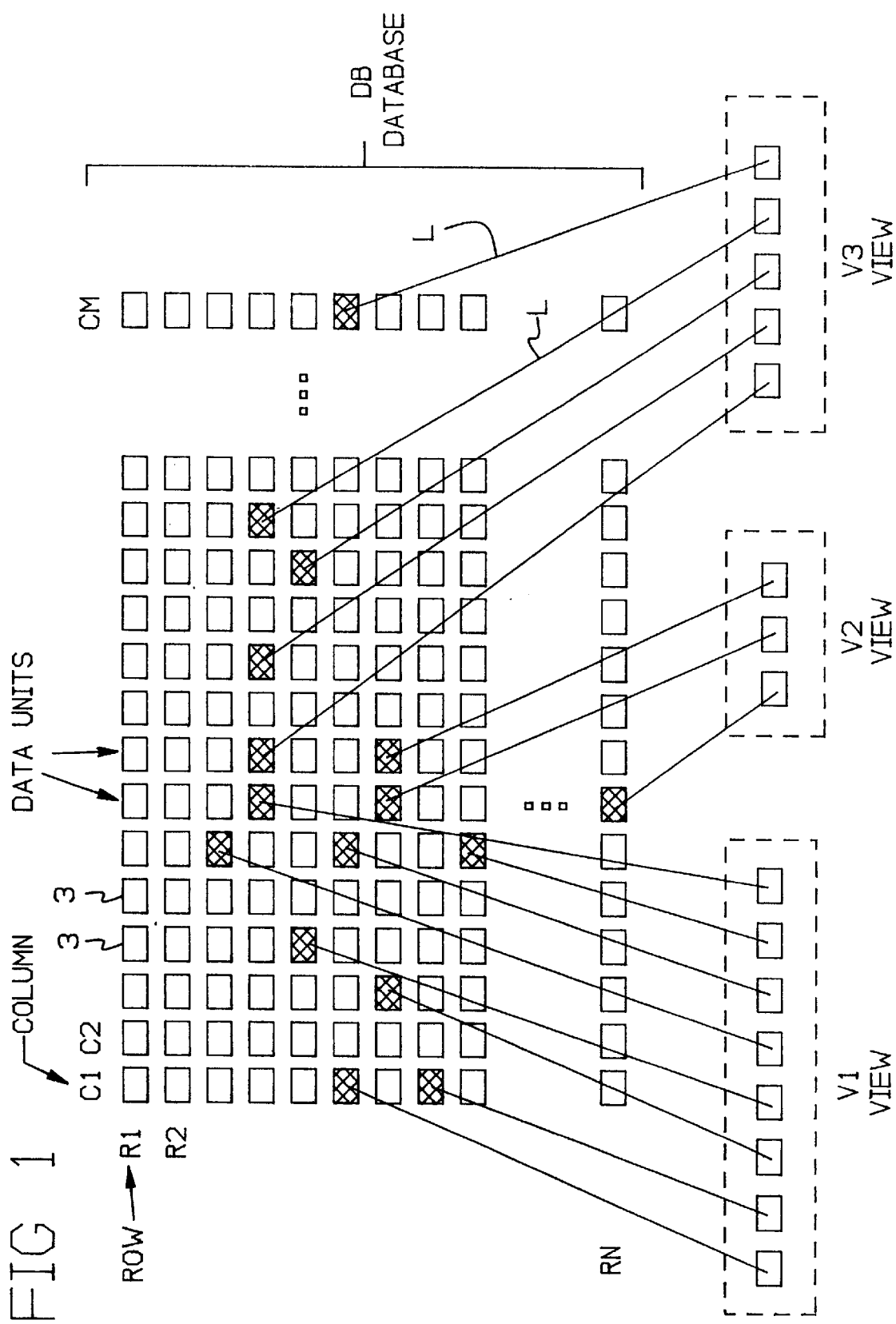
FIG. 1 is a generic illustration of a database, and views of the database.
Figure 2:
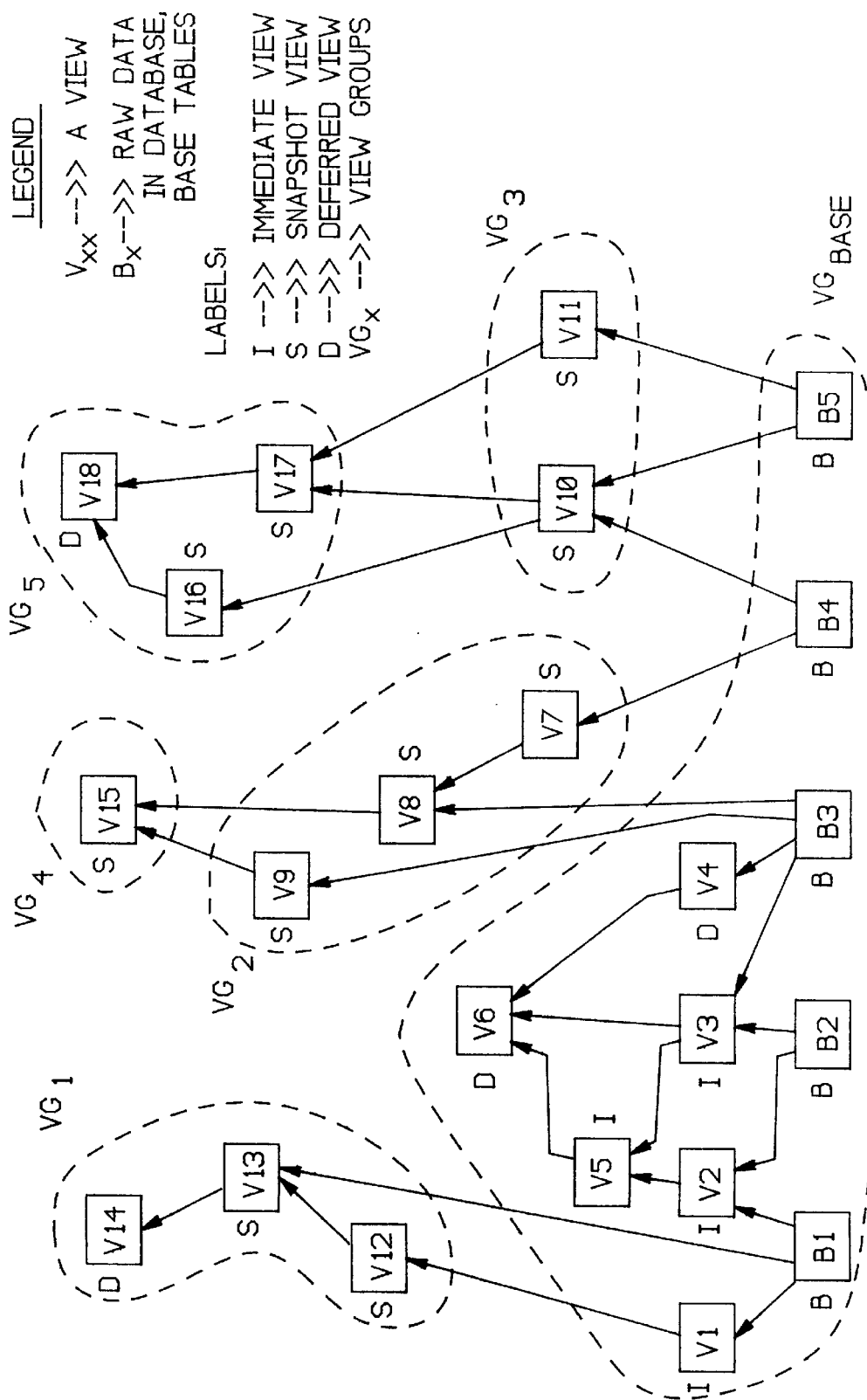
FIG. 2 illustrates a dependency graph used by the invention.

The invention allows views to be derived not only from the database, but also from raw data which is stored in the database. FIG. 2 provides an example of derivation of a view from another view, and represents a dependency graph used by the invention. Items B1–B5 represent the raw data in the database, and will be called base tables herein. View V1 is derived from base table B1. However, view V13 is derived from two sources (1) view V12, which itself is derived from view V1, and (2) base table B1.

The invention provides three types of views: immediate, deferred, and snapshot. The three types of views are refreshed differently.

Immediate views are refreshed immediately, whenever a change occurs in the subset of the base tables corresponding to the immediate view.

Snapshot views are refreshed at intervals specified by the creator of the view, such as once daily, or when refresh is requested by an authorized user. Thus, snapshot views may temporarily contain copies of old data.

Deferred views are refreshed only when they are sued, as when a user issues a query upon a deferred view.

In FIG. 2, each view is labeled with an "I," meaning immediate, "S," meaning snapshot, or "D," meaning deferred.

The dashed lines labeled VG1–VG5 and VGBase indicate view groups. A significant feature of the invention is that the data within view groups is kept internally consistent, so that a user can freely consult any number of views within a view group, while seeing data that is mutually consistent. That is, for example, in a given transaction, the user will not read values of two data items which are valid only during non-overlapping time intervals.

The arrows point from a parent, or ancestor, of a view to a child, or descendant. Descendants are said to be dependent on parents. For example, view V7 depends from base table B4. View V8 depends from both view V7 and base table B3.

Views must obey the following rules:
1. Each view is allowed to be assigned to exactly one view group.
2. Immediate views and deferred views must belong to the same viewgroup as their parents.
3. if any snapshot view in a viewgroup VG is updated in a transaction T, then all snapshot views in VG must be updated in T. Consequently, all snapshot views will be updated with the same periodicity, when updated.
4. Snapshot views cannot occur in the same view group as the base tables.
5. A view group can be derived from at most one other viewgroup.
6. Deferred views cannot have children in other view-groups.
7. An immediate view cannot have a deferred view or a snapshot view as a parent.
8 A snapshot view cannot have a deferred view as a parent.
9. All the base tables must be included in a single view group which will be called VGBase.

When a user creates a view, the user specifies the parents of the view, and thus determines the position of the view within the dependency graph of FIG. 2. The user is responsible for following the rules stated above in the creation process. Alternately, software can be designed which implements the rules, and allows the user to assign any properties whatsoever to the created views. If the properties violate the rules, the software so informs the user.

Once the views comply with the rules stated above, the views are maintained by computer programs which follow the logic given in the flowcharts shown in FIGS. 3A and 3–3C. It should be emphasized that the term "maintain" is a term-of-art. It does not merely mean "to keep" or "to store," as some dictionary definitions state. Rather, it includes the concept of actively monitoring, and retaining data consistency. Thus, it refers generally to processes such as those described in the flowcharts just identified.

FIG. 3B

FIG. 3B is an overview of the operation of the invention. In effect, the invention continually cycles through loop 3. When block 5 is reached, the invention inquires, for each snapshot view, whether refreshing is required at that time. The user who created each snapshot view specifies the refreshing period, and block 5 refreshes each snapshot view accordingly.

Decision block 10 inquires whether the database has been modified. Whenever a modification occurs, the immediate views which are affected are refreshed, as indicated by block 15.

Decision block 20 inquires whether a query has been issued for a deferred view. Whenever a deferred view is queried, that view, together with selected other views, as explained later, are refreshed, before the query is evaluated, as indicated by block 25.

Decision block 30 inquires whether a view has been added. If so, a particular process, termed the add view process, is run, as indicated by block 35. The logic then returns to block 5, and repeats.

FIG. 3C

FIG. 3C illustrates a system which implements one form of the invention. The processes described herein are indicated by block 45, which runs on a computer 40, which is equipped with database 50.

FIG. 3A

FIG. 3A illustrates refreshing of a view. In general, logs are kept of changes which have been made to the database, or base tables B in FIG. 2. Such logs are known in the art. Similarly, logs are maintained for each view Vi in FIG. 2 such that Vi is the parent of at least one snapshot or deferred view.

The refreshing process consults the logs to determine the relevant changes made since the last refreshing, and alters the view's materialization accordingly. In addition, some other steps may need to be taken, with respect to other views. For example, if an immediate view depends from the view being refreshed, that view must be also refreshed, because, by stipulation, immediate views are refreshed whenever their parents change. Such additional steps are performed in block 1120 which call the function MAKESAFE(U), which is shown in FIG. 8C.

Block 1100 represents consultation of the logs of the database. In addition, if the view to be refreshed is an immediate view, a specific type of log is consulted, which exists only for the duration of the transaction undertaken. This log is resident in main memory.

In block 1110, an update command U is generated. This command contains the necessary data for refreshing the view. Block 1120 calls a routine called Makesafe, and passes the command U to it. The logic of Makesafe is described in other Figures. Block 1130 terminates the refresh.

Figure 7A:
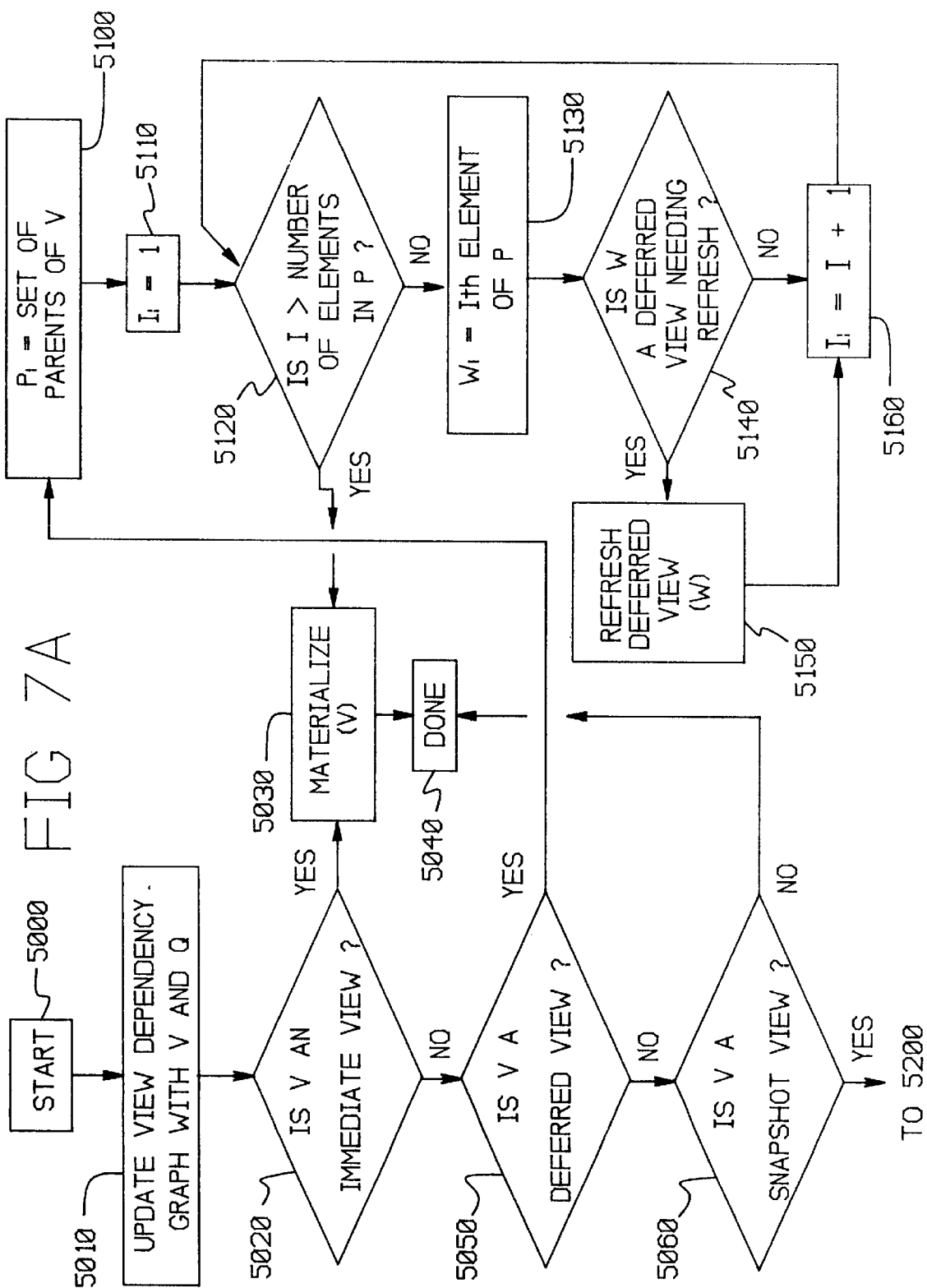
Figure 8B:
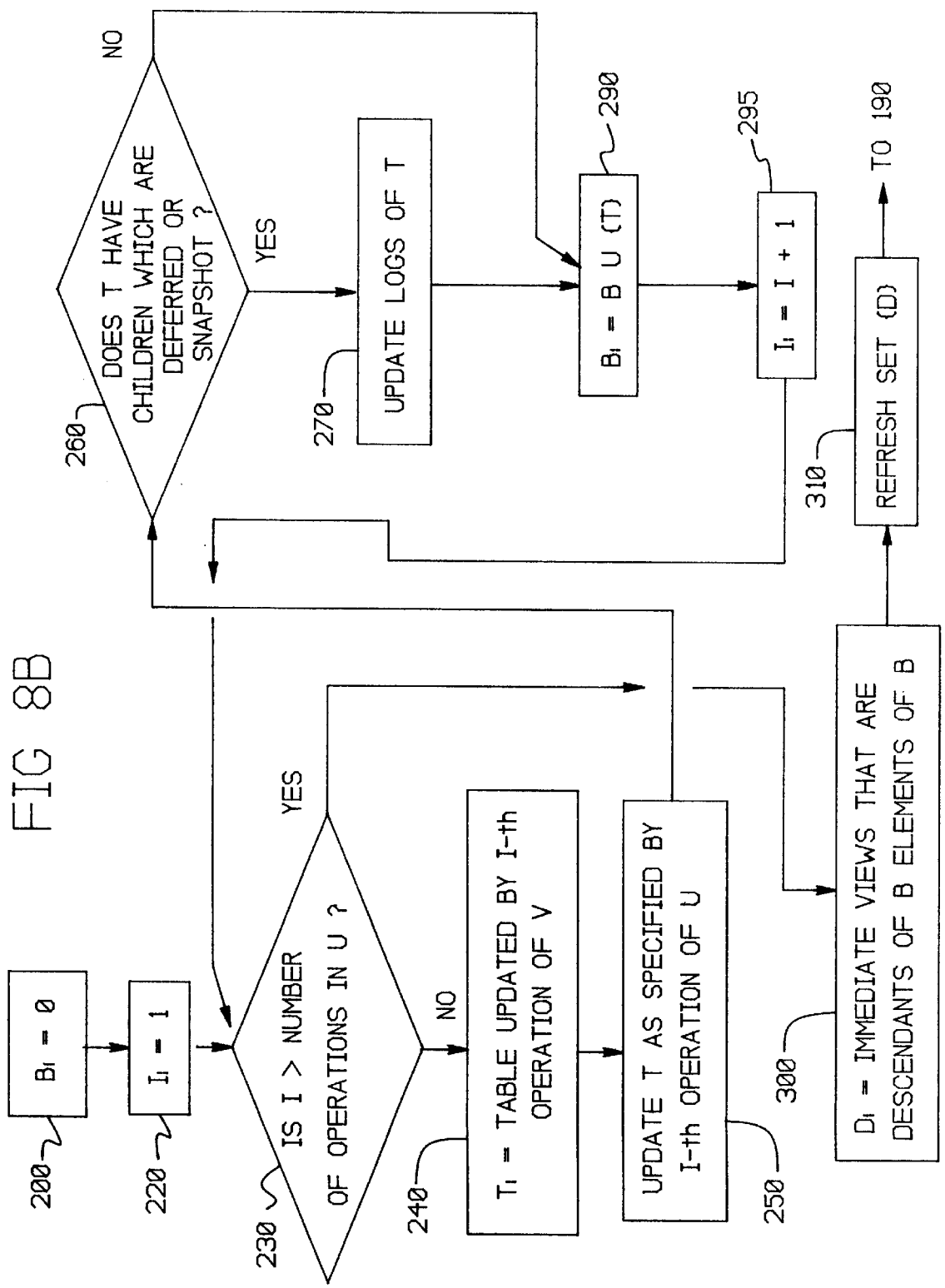

The logic of FIG. 3A is invoked by other logic, such as block 3030 in FIG. 5, block 5150 in FIG. 7C, block 5210 in FIG. 7B, and block 310 in FIG. 8B.

FIG. 4

FIG. 3A illustrated logic used for refreshing a single view. FIG. 4 illustrates the logic used for refreshing a set of views, such as group VG1 in FIG. 2. As will be seen, the refresh logic of FIG. 3A is called in block 1060. The set D may not match the total contents of a view group. Further, this set is a transient data structure that is produced in the transaction asking for the set to be refreshed. This set is emptied in the course of the transaction, but this emptying has no impact on the structures, such as view groups, predating the transaction.

The logic, in effect, starts the refreshing process at the highest level of parents within set D, which would be view V12, and then proceeds to the lowest level of children, which would be view V14.

In FIG. 4, the logic begins at block 1000, and then proceeds to block 1010, wherein index j is initialized. In decision block 1020, inquiry is made whether the current value of j exceeds the number of views presently remaining in the set D. As will be seen, views are conceptually removed from the set D as they are refreshed, so that the number of views standing in the set D changes during the refresh process.

If no further views need refreshing, block 1095 is reached, indicating that the refresh process is finished. If views do remain, then block 1030 is reached, wherein a variable JD is defined as indicating the J-th view in the group. Decision block 1040 inquires whether JD has any parents in the set D. If so, then the index J is incremented by unit in block 1050, and the logic returns to decision block 1020. This incrementation prevents the present view, JD, from being refreshed at this time, because a parent of JD has not been refreshed and so is still present in the set D. Because of the operation of the logic, this view will be refreshed after all its parents are refreshed.

If no parents exist in set D, the logic reaches block 1060, which refreshes the view JD. The view JD is conceptually removed from the set D, in block 1070, and the logic returns to block 1010. The view JD is not removed from dependency graph, nor is the view group containing it altered. The "removal" occurring in block 1070 is performed on a transient data structure, and is done for accounting purposes within the logic.

FIG. 5

FIG. 5 illustrates the refreshing of a deferred view. The logic, in effect, identifies all ancestors of the deferred view, and refreshes them if required. After this refreshing, the deferred view is materialized.

The logic begins with block 3000 which identifies the ancestors of V and stores them in the set D. It does this identification with a recursive traversal of the view dependency graph using a standard algorithm like depth-first, or breadth-first search. Such algorithms are well known in the art. It then calls Refresh-Set, which is shown in FIG. 4, and passes D to it as a parameter in block 3010.

FIG. 6

FIG. 6 illustrates logic which refreshes a group of snapshot views. The logic starts in block 2000. Block 2010 identifies the set D of the snapshot views contained in the view group, and block 2020 refreshes all views in the view group. FIG. 4 illustrates refreshing generically.

FIGS. 7A AND 7B

FIG. 7A and 7B illustrate logic which allows a user to add a new view. FIG. 7C illustrates the logic flow of these two Figures together. The user specifies data which indicates the position of the view within the dependency graph of FIG. 2.

The new view is specified in terms of a name, V, and a query, Q, which define V. V and Q are passes as parameters to the routine described below. The logic begins with block 5000, and proceeds to block 5010, which updates the view dependency graph, one of which is shown in FIG. 2. Decision block 5020 inquires whether the new view is an immediate view. If so, block 5030 causes materialization of the new view. That is, data is computed and then copied into the view from the appropriate sources. Block 5040 indicates that the creation procedure for the new view terminates.

If the new view is not an immediate view, decision block 5050 inquires whether the new view is a deferred view. If so, the logic jumps to block 5100. This block, and subsequent blocks through block 5160, inquire whether any parents of the new view are deferred views and, if so, whether they require refreshing. If refreshing is required, it is done, and then the view is materialized.

Explaining this process in more detail, block 5100 identifies variable P, later used, as representing the set of parents of the new view. The identities of the parents were stored in the view dependency graph and computed using a standard graph traversal algorithm. Block 5110 initializes an index i. Decision block 5120 inquires whether the current value of the index i exceeds the present number of elements in the set P. If so, then no more parents exist who need refreshing, and the logic proceeds to block 5030, where the new view is materialized.

If parents do exist which need refreshing, then the logic proceeds to block 5130, which designates the i-th parent as variable W. Block 5140 inquires whether the parent W is a deferred view, which needs refreshing. If so, refreshing occurs in block 5150, and the logic proceeds to block 5160. If not, the logic reaches block 5160, wherein the index i is incremented by one. Upon incrementing, the logic returns to block 5120, as indicated.

If, in decision block 5050, it was determined that the new view is not a deferred view, the logic reaches block 5060, which inquires whether the new view is a snapshot view. If not, an error has occurred, and the logic reaches block 5040, which terminates the process.

If the view is a snapshot view, then the logic reaches decision block 5200, which inquires whether any parent of the new view exists outside the new view's viewgroup. If not, the logic proceeds to block 5030, which materializes the new view. If an outside parent does exist, then the logic reaches block 5220 which refreshes the group containing the new view. Then the logic proceeds to block 5030, which materializes the new view.

FIGS. 8A AND 8B

FIGS. 8A and 8B illustrates the Makesafe operation. FIG. 8C illustrates the logic flow of these two Figures together. Steps 100 through 190 illustrate updating a single view V. These steps will only be reached by calling Makesafe from FIG. 3A. The instructions of command U are executed, which updates view V. If view V has children, the logs of view V are updated, for their benefit. Makesafe is called either for a single view update command, or for a collection of updates to base tables.

In steps 200–300, if base tables are being updated, then, in addition to the updating of the base tables, the immediate dependents of the views are refreshed. This refreshing is not required for updates to immediate views in Makesafe because by rule 7, above, all the parents of an immediate view are either immediate views or base tables. Consequently, only the update to a base table could start the process that causes Makesafe to be called for V. However, then blocks 300 and 310 in Makesafe, which apply to the base table updates, ensure that V's children are maintained.

An update command, U, is generated, as indicated in block 1110 in FIG. 3A. Decision block 100 in FIG. 8 inquires whether the command U requires updating of these base tables. If not, the logic proceeds to block 110, wherein variable V is defined as the view to be updated.

In block 120, the update is performed. In decision block 130, inquiry is made as to whether the view V has children which are either deferred or snapshot type. If so, the logs of view V are updated in block 140, and the logic terminates in block 190. If not, the logic terminates in block 190.

If, in block 100, updating of base tables is required, the logic jumps to 200. An empty set B is created Set B will contain a collection of tables. In block 220, an index i is initialized to unity. Decision block 230 inquires whether the present value of index i exceeds the number of operations in command U. Command U is generated in block 1110 in FIG. 3A. If not, the logic reaches block 240 in FIG. 8, which defines variable T as the base tables to be updated by the i-th operation of command U. If so, the logic reaches block 300.

Block 250 updates table T as specified by the i-th operation of command U. Decision block 260 inquires whether table T has children which are deferred or snapshot type. If so block 270 updates the logs of the table T, and the logic reaches decision block 290. If not, decision block 290 is reached directly.

Base table T is then added to set B, by the union operation of block 290. Index i is incremented by unity in block 295, and the logic returns to block 230.

If, in decision block 230, it was determined that index i exceeds the number of operations in command U, then block 300 is reached, wherein a set D is defined as the set of immediate views which are descendants of elements of set B. Block 310 refreshes those views, and the logic terminates in block 190.

FIG. 9 illustrates a system for implementing the invention. A computer COMP contains component C, which represents software, firmware, hardware, or any combination of these, which execute the logic described above. The computer COMP has access to the database D.

Numerous substitutions and modifications can be undertaken without departing from the true spirit and scope of the invention. What is desired to be secured by Letters Patent is the invention as defined in the following claims.

What is claimed is:

1. A method of operating a system which contains a database, comprising the following steps:
   refreshing a first class of views of the database in response to the occurrence of one of a first class of events;
   refreshing a second class of views of the database in response to the occurrence of one of a second class of events; and
   in predetermined groups of views, maintaining mutual consistency in the data within each group.

2. A system, comprising:
   a database, containing data which changes over time;
   means for providing
      immediate views of the database, which are refreshed whenever changes occur to the database;
      deferred views of the database, which are refreshed whenever a query is made upon the deferred view; and
      snapshot views of the database, which are refreshed at intervals;
   means responsive to user input for collecting selected immediate views, deferred views, and snapshot views into respective view groups; and
   means for maintaining mutual consistency of all views within every view group.

3. A method of operating a system which contains a database, comprising the following steps:
   maintaining views, at least one of which are views of other views, and at least one of which of which are views of the database;
   maintaining a view dependency graph of dependency relations of the views; and
   in predetermined groups of views, maintaining mutual consistency in the data within each view group.

4. A system, comprising:
   a database;
   means for generating views based on the database, in which at least one view depends on at least one other view; and
   means for maintaining data which represents dependency relationships of the views,
   wherein all views exhibit the following characteristics:
   a) each view is assigned to exactly one view group;
   b) all immediate views and deferred views belong to the same viewgroup as their parents;
   c) if any snapshot view in a viewgroup VG is updated in a transaction T, then all snapshot views in VG are updated in T;
   d) no snapshot view occurs in the same view group as base tables;
   e) every view group is derived from at most one other viewgroup;
   f) deferred views have no children in any other viewgroups;
   g) no immediate view has a deferred view or a snapshot view as a parent;
   h) no snapshot view has a deferred view as a parent; and
   i) all the base tables are included in a single view group (VGBase).

5. A system, comprising:
   a database;
   means for generating views based on the database, in which at least one view depends on at least one other view; and means for maintaining data which represents dependency relationships of the views,
   wherein each view is assigned to exactly one view group, and all views exhibit at least one of the following characteristics:
   a) all immediate views and deferred views belong to the same viewgroup as their parents;
   b) if any snapshot view in a viewgroup VG is updated in a transaction T, then all snapshot views in VG are updated in T;
   c) no snapshot view occurs in the same view group as base tables;
   d) every view group is derived from at most one other viewgroup;
   e) deferred views have no children in any other viewgroups;
   f) no immediate view has a deferred view or a snapshot view as a parent; and
   g) no snapshot view has a deferred view as a parent.

6. In a system containing:
   a database;
   means for generating views based on he database, in which at least one view depends on at least one other view; and
   means for maintaining data which represents dependency relationships of the views,
   the improvement comprising the following steps:
   a) eliminating snapshot views from view groups containing base tables; and
   b) if any snapshot view in a viewgroup VG is updated in a transaction T, then updating all snapshot views in VG.

7. In a system containing:

a database;

means for generating views based on the database, in which at least one view depends on at least one other view;

means for generating views based on the database, in which some views depend on other views; and means for maintaining data which represents dependency relationships of the views, wherein each view is assigned to exactly one view group, the improvement comprising the following steps:

a) keeping no snapshot views in view groups containing base tables; and b) if any snapshot view in a viewgroup VG is updated in a transaction T, then updating all snapshot views in VG.

8. A system, comprising:

a database;

means for generating views based on the database, in which at least one view depends on at least one other view; and means for maintaining data which represents dependency relationships of the views, wherein views exhibit the following characteristics:

a) each view is assigned to exactly one view group;

b) every view group is derived from at most one other viewgroup; and c) all base tables are included in a single view group (VGBase).

9. A system, comprising:

a database;

means for generating views based on the database, in which at least one view depends on at least one other view;

means for generating views based on the database, in which some views depend on other views; and means for maintaining data which represents dependency relationships of the views, wherein each view is assigned to exactly one view group, the improvement comprising the following steps:

a) each view is assigned to exactly one view group;

b) every view group is derived from at most one other view group; and c) all base tables are included in a single view group (VGBase).

10. A system, comprising:

a database;

means for generating views based on the database, in which at least one view depends on at least one other view; and means for maintaining data which represents dependency relationships of the views, wherein respective views exhibit the following characteristics:

a) all immediate views and deferred views belong to the same viewgroup as their parents;

b) if any snapshot view in a viewgroup VG is updated in a transaction T, then all snapshot views in VG are updated in T;

c) no snapshot view occurs in the same view group as base tables;

d) deferred views have no children in any other viewgroups;

e) no immediate view has a deferred view or a snapshot view as a parent; and f) no snapshot view has a deferred view as a parent.

11. A system, comprising:

a database;

means for generating views based on the database, in which at least one view depends on at least one other view;

means for generating views based on the database, in which some views depend on other views; and means for maintaining data which represents dependency relationships of the views, wherein each view is assigned to exactly one view group, and respective views exhibit the following characteristics:

a) if any snapshot view in a viewgroup; VG is updated in a transaction T, then all snapshot views in VG are updated in T;

b) no snapshot view occurs in the same view group as base tables;

c) deferred views have no children in any other viewgroups;

d) no immediate view has a deferred view or a snapshot view as a parent; and e) no snapshot view has a deferred view as a parent.

12. System according to claim 6, wherein no snapshot view has a deferred view as a parent.

13. System according to claim 8, wherein no snapshot view has a deferred view as a parent.

* * * * *